March 14, 1967 O. G. WOODRUFF 3,308,500
ANIMAL COMB AND BRUSH COMBINATION
Filed Oct. 11, 1965

INVENTOR.
OSCAR G. WOODRUFF
BY Kimmel, Crowell & Weaver
ATTORNEYS.

3,308,500
ANIMAL COMB AND BRUSH COMBINATION
Oscar G. Woodruff, 404 N. Oro St.,
Stockton, Calif. 95205
Filed Oct. 11, 1965, Ser. No. 494,706
3 Claims. (Cl. 15—369)

This invention relates to a comb and brush combination for use in the grooming of animals in which a vacuum source may be attached thereto for removing loose hair and the like, such as may occur after a clip for dogs or the like or after a haircut for humans.

It is known in the art to utilize a vacuum source for retrieving cut hair from the body of animals or the head of an individual. The use of a vacuum source powerful enough to efficiently retrieve cut hair results in a suction powerful enough to draw the remaining hair or skin of the animal or individual into the suction opening much to the discomfort and chagrin of the individual or animal being subjected thereto.

Another disadvantage of animal type brushes is that a particular brush may be adapted for use on a short haired dog while another brush may be required for a dog or other animal having a long fuzzy coat. This necessitates a plurality of separate brushes for animals having differently textured coats.

It is an object of the instant invention to construct a device for gathering cut hair from the skin of an animal or from the head of a human which is so constructed and arranged to collect efficiently the cut hair without injuring the pet or individual by withdrawing uncut hair or skin into a suction inlet.

Another object of the instant invention is to provide a grooming tool for hirsute mammals providing a relatively straight hair flow path.

Still another object of the instant invention is to provide a grooming device having at least two differenntly configured grooming implements.

A further object of the instant invention is to provide a grooming device for hirsute mammals having a rotatably mounted grooming implement frame carrying at least two grooming implements selectively located in a working position for combing the hair or massaging the ectoderm.

A more specific object of the instant invention is to provide a grooming device of the character described having at least two grooming implements rotatably mounted thereon including means for selectively positioning the grooming devices to position a predetermined grooming device in a working position.

Another object of the instant invention is to provide a grooming device of the character described which is inexpensive to construct, infallible in operation and which may be used for many different grooming operations.

Other objects and advantages of the instant invention, as well as the invention itself, reside in the combinations of elements, arrangements of parts, and features of construction and operation, all as will be more fully pointed out hereinafter and disclosed in the accompanying drawing wherein there is shown a preferred embodiment of this inventive concept.

Figure 3:
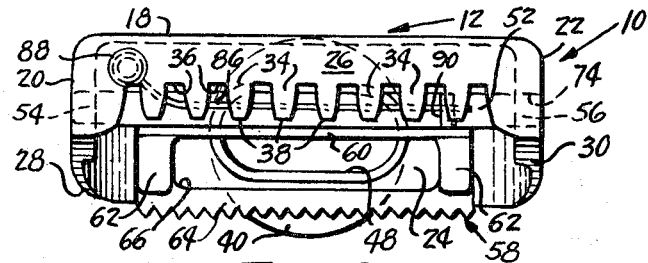
FIGURE 3 is a front elevational view of the device of FIGURES 1 and 2.

Referring now to the drawing in detail, wherein like reference characters designate like elements throughout the several views thereof, there is indicated generally at 10 a brush and comb combination or grooming tool having as its major components a frame shown generally at 12 receiving a conduit designated generally at 14 to which a vacuum source may be attached with frame 12 housing a grooming implement frame denominated generally at 16.

Frame 12 includes a top wall 18 on which are perpendicularly mounted a pair of sidewalls 20, 22, a back or rear wall 24 receiving conduit 14 and a front wall 26. It will be seen that each of side walls 20, 22 and rear wall 24 provides a bottom edge 28, 30, 32 lying in a common plane disposed at an angle with respect to top wall 18 and inclined upwardly from a horizontal plane passing through conduit 14. Front wall 26 carries a plurality of coplanar depending spaced apart teeth 34 forming a series of large openings 34 which serve as air inlet openings as will be more fully explained hereinafter. Each of teeth 34 includes a lower edge 38 lying in a plane parallel to top wall 18 and lying above the plane formed by bottom edges 28, 30, 32.

Conduit 14 includes a tubular section 40 forming a central passageway 42 and an adaptor section 44 forming a passageway 46. As may be apparent by a comparison of FIGURES 3 and 4, adaptor section 44 changes from a substantially tubular cross sectioned conduit at the junction of tubular section 40 to a substantially oval cross sectioned conduit forming an oval opening 48 interiorly of frame 12. Adaptor section 44 may be made of metal, plastic or the like and may be secured by any conventional means to frame 12 which may be made of a similar material.

Tubular section 40 of conduit 14 may be secured to a vacuum source, such as a vacuum cleaner, by any conventional means providing air flow through air openings 36, the exposed under surface of frame 12, which is hereinafter termed a frame air inlet shown generally at 50. As will be explained more fully hereinafter, the vacuum source will be activated drawing air through air inlet openings 36 and frame air inlet 50 to retrieve cut hair and the like from the skin of a hirsute mammal.

Grooming implement frame 16 includes a body 52 forming a pair of reduced size cylindrical pivot pins 54, 56 providing an axis of rotation about which frame 16 may move as more fully explained hereinafter. Body 52 carries a first grooming implement shown generally at 58, which is illustrated as a curry comb having a transverse slat 60 secured to body 52 parallel to the axis of rotation thereof, a pair of arms 62 depending from slat 60 carrying a transverse toothed bar 64. As will be seen in FIGURE 3, slat 60, arms 62 and bar 64 cooperate to form an opening 66 which will be found useful in the operation of the vacuum source as more fully explained hereinafter. Grooming implement frame 16 includes a second grooming implement designated generally at 68, which is illustrated as a bifurcated comb having two diverging series of aligned teeth 70.

Grooming implement frame 16 is rotatably mounted in sidewalls 20, 22 by a slot 72 formed in side wall 20 and a circular aperture 74 formed in side wall 22. A pin 76 is reciprocably mounted in a pair of aligned shoulders 78, 80 secured to side wall 20 with an enlarged head 82 secured to pin 76 for conveniently removing it from shoulders 78, 80. It will be readily apparent that pin 76 may be removed allowing cylindrical pivot pin 54 to be moved out of slot 72 reciprocating pivot pin 56 out of circular aperture 74 in order to remove grooming implement frame 16 and inserting another.

Figures 1, 2, 4:
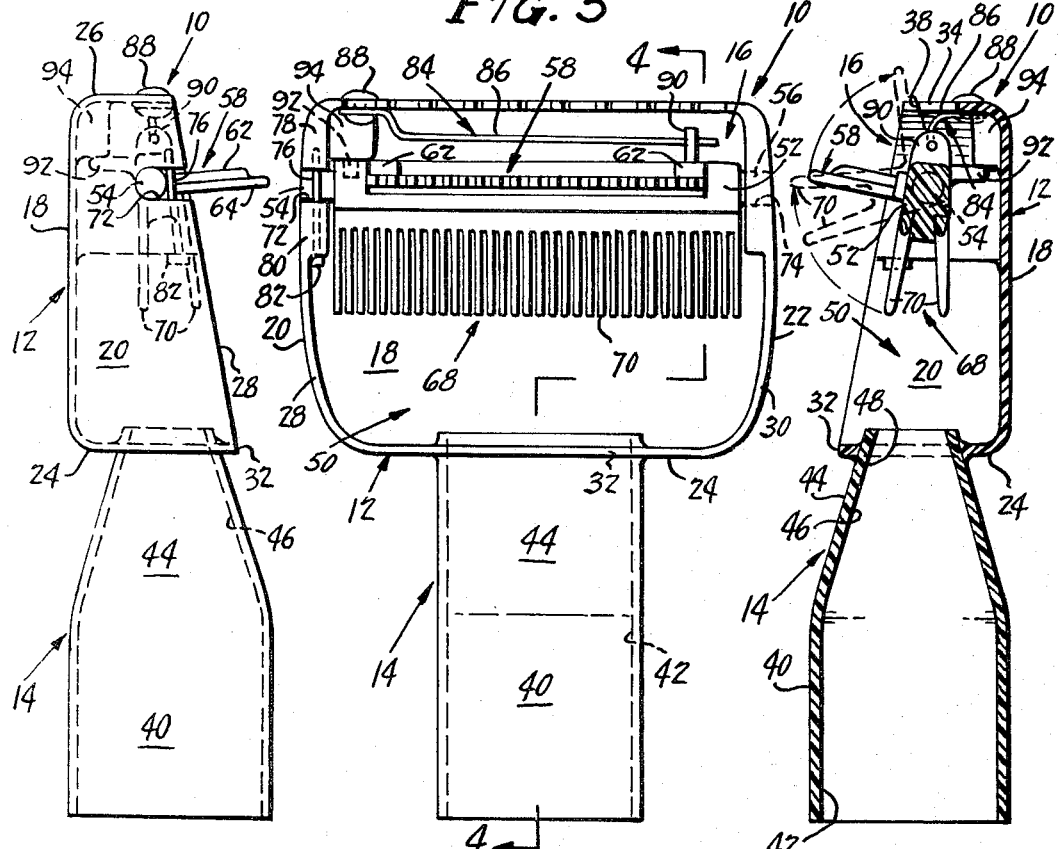
FIGURE 1 is a bottom view of the grooming tool of the instant invention housing a grooming implement frame equipped with two differently configured grooming implements.
FIGURE 2 is a side elevational view of the device of FIGURE 1 showing one of the grooming implements located in a working position.
FIGURE 4 is a longitudinal cross sectional view of the device of FIGURE 1 taken substantially along line 4—4 viewing in the direction of the arrows indicating in dotted lines the location of a second grooming implement in a working position.

As may be seen in FIGURES 1 and 4, a spring biasing means show generally at 84 selectively positions implement frame 16 in a first position presenting curry comb 58 in an operating position. Spring biasing means 84 includes a spring wire 86 secured to front wall 26 by a rivet, screw or the like 88 with spring wire 86 being slidably received by an abutment 90 secured to body 52 opposite from bifurcated comb 68. Spring wire 86 is biased outwardly from top wall 18 and acts to urge abutments 90 in a counter clockwise direction about the axis of rotation of body 52 as may be seen in FIGURE 4. In order to position curry comb 58 in the working position shown in FIGURE 2, a stop bar 92 is fixedly secured to body 52 on opposite sides thereof from curry comb 58. A stop block 94 is mounted on the inner sides of top wall 18 in the path of rotatable stop bar 92 to preclude the rotation of grooming implement frame past the position shown in FIGURE 4.

In the description of the utilization of grooming tool 10, it s first assumed that no vacuum source is connected to conduit 14 thus using the device as a comb. It will be apparent that spring biasing means 84 rotates grooming implement frame 16 into a first position presenting curry comb 58 in the operable position shown in FIGURE 2. Conduit 14 may be grasped by an individual with pushing strokes being conducted running toothed bar 64 along the skin of a hirsute mammal. Since stop bar 92 cooperates with stop block 94 it will be apparent that pushing movements with grooming tool 10 will not rotate implement frame 16.

When it is desired to use bifurcated comb 68, it is necessary only to impart pulling movements to grooming tool 10. Curry comb 58 will be rotated in a clockwise direction, as may be seen by the arrows in FIGURE 4, until teeth 70 of comb 68 engage hair on the animal's skin. The frictional contact between the animal's hair and skin with teeth 70 acts to rotate implement frame 16 to a second position, as may be seen in FIGURE 4, presenting second grooming implement 68 in a working position. Preventing implement frame 16 from further clockwise rotation is the contact between curry comb 58 and lower edges 38 of teeth 34.

When it is desired to utilize grooming tool 10 as a device for removing hair and the like, it is necessary only to attach a connection from the vacuum source, such as a vacuum cleaner, onto conduit 14 thus creating a flow of air through air inlet openings 36 and frame air inlet 50. It will be apparent that a pushing movement imparted to grooming tool 10 will position curry comb 58 in the operating position kicking loose particles rearwardly thereof toward inlet 48 of conduit 14. Curry comb 58 will also tend to impart forward movement to some particles which may be drawn through opening 66 in curry comb 58 then into opening 48 of conduit 14. If it is desired to utilize bifurcated comb 68 to remove clipped hair from an animal or human, it is necessary only to impart a pulling movement to grooming tool 10 with a vacuum attachment secured to conduit 14.

Figure 5:
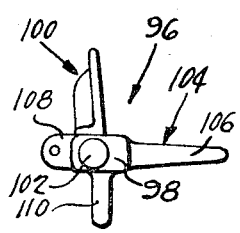
FIGURE 5 is a side elevational view of another grooming implement frame equipped with separate grooming implements of different configurations.

Referring now to FIGURE 5, there is indicated generally at 96 another form of grooming implement frame having a rectangular body 98 to which is fixedly secured a first grooming implement indicated generally at 100, which is illustrated as a curry comb identical with first grooming implement 58. Body 98 forms a pair of cylindrical pivot pins 100 extending outwardly from body 98 forming an axis of rotation for implement frame 96. A second grooming implement indicated generally at 104 is secured at 104 is secured to body 98 and includes a plurality of aligned comb teeth 106. An apertured abutment 108 is attached to body 98 opposite from comb teeth 106 with a stop bar 110 also being rigidly secured to body 98 opposite from curry comb 100. It will be apparent that grooming implement frame 96 is identical with respect to grooming implement frame 16 except that bifurcated comb 68 has been replaced by a single tier comb 104.

Figure 6:
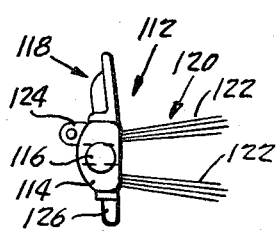
FIGURE 6 is a side elevational view of still another grooming implement frame equipped with separate grooming implements.

Referring now to FIGURE 6 in detail, still another grooming implement frame is designated generally at 112 having a body 114 forming a pair of laterally extending cylindrical pivot pins 116 insertable into slot 72 and circular aperture 74 as previously mentioned with respect to grooming implement frame 16. A first grooming implement designated generally at 118 is secured to body 114 and is identical with curry combs 58, 100. A bifurcated brush shown generally at 120 includes a pair of outwardly diverging series of bristles 122 with an apertured abutment 124 being positioned on the other side of body 114. Completing the structure of grooming implement frame 112 is a stop bar 126 positioned opposite from curry comb 118. It should be apparent that many different types of implements may be placed on the implement frames of the instant invention to perform various types of grooming operations.

It should also be pointed out that the configuration of frame 12 allows the use of powerful vacuum sources attached to conduit 14 without injuring the person or animal subjected to the suction thereof. First, air inlet openings 36 and the opening formed between lower edges 38 of teeth 34 and the plane formed by bottom edges 28, 30, 32 allow the influx of air into frame 12 even when implement frame 16 is removed. Air entering these openings travels in a substantially straight path, the front of frame 12 into opening 48 of conduit 14. Second, the upward inclination of the plane formed by bottom edges 28, 30, 32 diminishes the thickness of frame 12 such that when grooming implement frame 16 is positioned interiorly thereof, bottom edges 28, 30, 32 frame 12 cannot become flush with the skin of the animal or person.

It is now seen that there is herein provided an improved grooming tool or brush and comb combination having all of the objects of this invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:

1. An animal grooming implement comprising a frame including a top wall, a pair of side walls, a front wall, a rear wall and an open bottom, said rear wall having an opening therein, a tubular member having an open end secured in said opening, said tubular member comprising a handle and a connector adapted to be secured to a source of vacuum pressure, said side walls having aligned slots therein, at least one of said slots communicating with said open bottom, a grooming implement body, a pair of stub axles extending from said body rotatably journalled in said slots, releasable means retaining said axles in said slots, a first grooming implement extending from said body, a second grooming implement extending from said body at substantially right angles to said first implement, spring means in said frame biasing said body to a position wherein said first element extends outwardly of said frame through said open bottom to a position substantially perpendicular to said top wall, stop means on said implement body limiting rotation of said body in one direction to said position, rotation of said body in the other direction against the bias of said spring means extending said second grooming implement to a position substantially perpendicular to said top wall, and stop means limiting rotation of said body to said last mentioned position.

2. The structure of claim 1 wherein the edge of said front wall adjacent said open bottom carries a plurality of coarse teeth.

3. The structure of claim 1 wherein said releasable means retaining the axles in the slots comprise at least one pin slidable to selectively open and close said slot to permit removal of said grooming implement body and replacement with a different grooming implement body.

References Cited by the Examiner

UNITED STATES PATENTS

| 1,086,188 | 2/1914 | Line | 119—88 |
| 1,128,487 | 2/1915 | Morrow | 15—369 |
| 1,770,749 | 7/1930 | Engberg et al. | 15—367 |
| 2,140,874 | 12/1938 | Juelson | 15—369 |
| 3,186,023 | 6/1965 | McCulloch | 15—364 |

FOREIGN PATENTS

| 71,554 | 4/1931 | Sweden. |

SAMUEL KOREN, *Primary Examiner.*

HUGH R. CHAMBLEE, *Examiner.*